United States Patent
Kagan

(10) Patent No.: US 8,886,862 B2
(45) Date of Patent: Nov. 11, 2014

(54) VIRTUALIZATION OF INTERRUPTS

(75) Inventor: Michael Kagan, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 114 days.

(21) Appl. No.: 13/207,418

(22) Filed: Aug. 11, 2011

(65) Prior Publication Data

US 2013/0042236 A1    Feb. 14, 2013

(51) Int. Cl.
   *G06F 13/24* (2006.01)
   *G06F 9/455* (2006.01)

(52) U.S. Cl.
   USPC .............................. 710/260; 710/262; 718/1

(58) Field of Classification Search
   None
   See application file for complete search history.

(56) References Cited

U.S. PATENT DOCUMENTS

| | | | |
|---|---|---|---|
| 7,209,994 B1 | 4/2007 | Klaiber et al. | |
| 7,222,203 B2 | 5/2007 | Madukkarumukumana et al. | |
| 7,302,511 B2 * | 11/2007 | Jeyasingh et al. | 710/260 |
| 8,180,944 B2 | 5/2012 | Serebrin et al. | |
| 2008/0294825 A1 | 11/2008 | Mahalingam et al. | |
| 2010/0023666 A1 | 1/2010 | Mansell et al. | |
| 2010/0070677 A1 | 3/2010 | Thakkar | |
| 2010/0115514 A1 * | 5/2010 | Maliszewski | 710/260 |
| 2010/0174841 A1 | 7/2010 | Bogin et al. | |
| 2010/0191885 A1 | 7/2010 | Serebrin et al. | |
| 2010/0191887 A1 | 7/2010 | Serebrin et al. | |
| 2010/0191888 A1 | 7/2010 | Serebrin et al. | |
| 2010/0191889 A1 | 7/2010 | Serebrin et al. | |
| 2010/0333101 A1 * | 12/2010 | Pope et al. | 718/103 |
| 2011/0106993 A1 * | 5/2011 | Arinobu et al. | 710/262 |
| 2011/0179417 A1 * | 7/2011 | Inakoshi | 718/1 |

OTHER PUBLICATIONS

U.S. Appl. No. 13/652,493 Office Action dated Jul. 18, 2014.

* cited by examiner

*Primary Examiner* — Lewis A Bullock, Jr.
*Assistant Examiner* — Melissa Alfred
(74) *Attorney, Agent, or Firm* — D. Kligler I.P. Services Ltd.

(57) ABSTRACT

A method for computing includes running a plurality of virtual machines on a computer having one or more cores and a memory. Respective interrupt addresses in the memory are assigned to the virtual machines. Upon occurrence on a device connected to the computer of an event pertaining to a given virtual machine during a period in which the given virtual machine is swapped out of operation, an interrupt message is written from the device to a respective interrupt address that is assigned to the given virtual machine in the memory. Upon activating the given virtual machine on a given core after writing of the interrupt message, a context of the given virtual machine is copied from the memory to the given core, and a hardware interrupt is automatically raised on the given core responsively to the interrupt message in the memory.

12 Claims, 2 Drawing Sheets ically illustrates a
VIRTUALIZATION OF INTERRUPTS

FIELD OF THE INVENTION

The present invention relates generally to computer systems, and specifically to handling of interrupts in a virtual machine environment.

BACKGROUND OF THE INVENTION

A virtual machine (VM) is a software implementation of a computer that executes programs like a physical machine. The VM supports an operating system (commonly referred to as a guest operating system) and application programs, which run on the VM transparently, as though it was an actual physical machine. Multiple virtual machines may share the same underlying physical machine resources. A software layer known as a virtual machine monitor (VMM, also referred to as a hypervisor) provides virtualization support to the VMs by mediating between the VM software and the underlying physical hardware.

SUMMARY

Embodiments of the present invention that are described hereinbelow provide efficient methods and devices for handling interrupts in a VM environment.

There is therefore provided, in accordance with an embodiment of the present invention, a method for computing, which includes running a plurality of virtual machines on a computer having one or more cores and a memory, such that different ones of the virtual machines are swapped out of operation on the cores at different times. Respective interrupt addresses in the memory are assigned to the virtual machines. Upon occurrence on a device connected to the computer of an event pertaining to a given virtual machine during a period in which the given virtual machine is swapped out of operation, an interrupt message is written from the device to a respective interrupt address that is assigned to the given virtual machine in the memory. Upon activating the given virtual machine on a given core after writing of the interrupt message, a context of the given virtual machine is copied from the memory to the given core, and a hardware interrupt is automatically raised on the given core responsively to the interrupt message in the memory.

In a disclosed embodiment, the device includes a network interface controller (NIC), and the event includes receiving at the NIC a data packet directed to the given virtual machine.

In some embodiments, writing the interrupt message includes identifying at the device whether the given virtual machine is active or swapped out, and deciding to write the interrupt message to the memory when the given virtual machine is swapped out or to raise the hardware interrupt immediately when the given virtual machine is active. The method typically includes passing information to the device as to which of the virtual machines are active and which are swapped out, wherein the device decides whether to write the interrupt message or to raise the hardware interrupt responsively to the information.

In one embodiment, the event causing the device to write the interrupt message is a first event type, and the method includes, upon the occurrence at the device of events of a second event type, raising the hardware interrupt for service by the given virtual machine immediately even when the given virtual machine is swapped out.

In disclosed embodiments, automatically raising the hardware interrupt includes copying the interrupt message from the respective interrupt address to an interrupt status register on the given core. Copying the interrupt message may include taking a logical OR between a first value stored in the respective interrupt address and a second value already held in the interrupt status register.

There is also provided, in accordance with an embodiment of the present invention, computing apparatus, including one or more computing cores, configured to run a plurality of virtual machines, such that different ones of the virtual machines are swapped out of operation on the cores at different times. A memory is connected to the computing cores, and respective interrupt addresses in the memory are assigned to the virtual machines. A device is connected to the cores and the memory and is configured, upon occurrence of an event pertaining to a given virtual machine during a period in which the given virtual machine is swapped out of operation, to write an interrupt message to a respective interrupt address that is assigned to the given virtual machine in the memory. The cores are configured, upon activating the given virtual machine on a given core after writing of the interrupt message, to copy a context of the given virtual machine from the memory to the given core and to automatically raise a hardware interrupt on the given core responsively to the interrupt message in the memory.

The present invention will be more fully understood from the following detailed description of the embodiments thereof, taken together with the drawings in which:

DETAILED DESCRIPTION OF EMBODIMENTS

In many virtualized environments, the number of virtual machines (VMs) in operation at any given time may substantially exceed the number of computing cores (which may be one or more) in the computer that are available to execute the VMs. Under these conditions, the VMs are swapped into and out of the cores, typically under control of the VMM, as they are needed for software tasks and as core resources become available. Each VM swap of this sort involves a context switch, in which register contents representing the operating state (the context) of the swapped-out VM are copied out of the core to memory, and the context of the VM that is to be swapped in is copied from the memory to the registers of the core in question.

Interrupt handling in this sort of environment can consume considerable time and system resources. Hardware interrupts raised by peripheral devices, such as a network interface controller (NIC) or other input/output (I/O) device, are detected by the VMM. Upon receiving an interrupt, the VMM must suspend execution of the active VM to service the interrupt—even if the interrupt is directed to a VM that is currently swapped out of operation. In I/O-intensive applications, in which peripheral devices frequently raise interrupts to signal incoming communications, the frequent breaks that are necessitated for handling interrupts directed to swapped-out VMs can degrade overall system performance.

Embodiments of the present invention that are described herein address this problem by providing virtualization of interrupts: Upon occurrence of an event in a peripheral device relating to a given VM that is currently swapped out of operation, the peripheral device does not send an interrupt directly to the CPU, but rather writes an interrupt message to a specified interrupt address in a memory segment that is assigned to hold the value of the interrupt register for the given VM. When the given VM is subsequently swapped into a given core, the VMM copies this memory segment to the registers of the core. When the memory contents are copied, the message that was saved in the interrupt address automatically causes the appropriate hardware interrupt to be raised on the core. The VM may then service the interrupt when it is swapped in, and the VMM is no longer required to deal immediately with interrupt-invoking events that are directed to swapped-out VMs.

Figure 1:
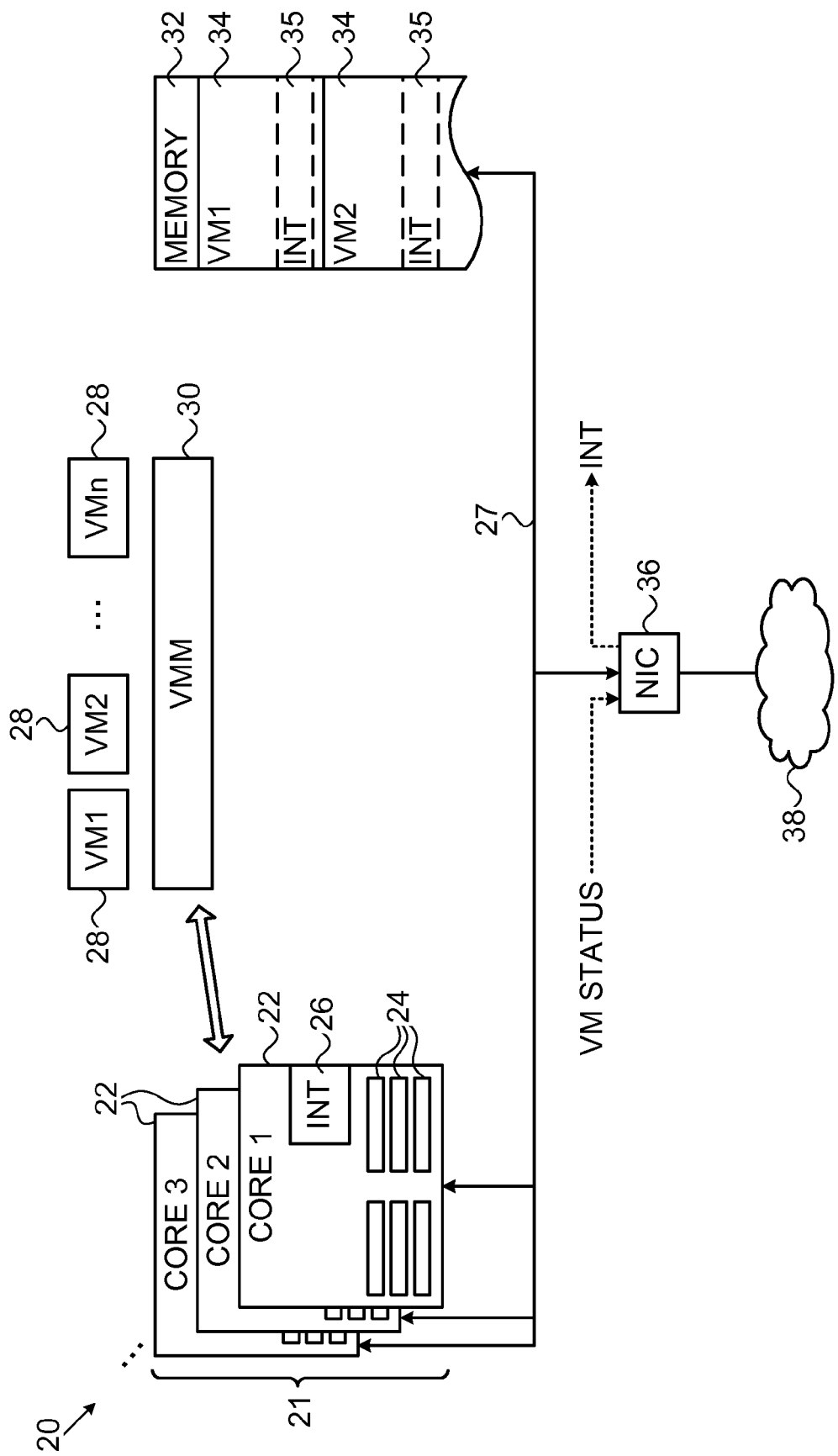
FIG. 1 is a block diagram that schematically illustrates a computer system, in accordance with an embodiment of the present invention.

FIG. 1 is a block diagram that schematically illustrates a computer system 20, in accordance with an embodiment of the present invention. System 20 in this example comprises a central processing unit (CPU) 21 having multiple cores 22. Each core comprises processing circuits, multiple registers 24, and one or more interrupt pins 26. The interrupt pins are typically "raised" by transmitting an interrupt message over a system bus 27 to the CPU, but other methods of interrupt signaling that are known in the art may alternatively be used.

Multiple virtual machines 28, labeled VM1, VM2, ..., VMn, may be active on CPU 21 at any given time. The virtual machines are supported by a VMM 30, as explained above, which is responsible for instruction virtualization and swapping of the VMs in and out of cores 22 as required. Each VM 28 has an assigned region in a memory 32. Each such region is used to store context information (including the contents of registers 24) for the corresponding VM, and also includes a dedicated interrupt address 35, typically at a predefined offset within the region.

Address 35 is used to store the contents of the CPU interrupt register that is associated with the VM in question which the VM is swapped out of operation. Several interrupts may be recorded ("set") in this interrupt register and correspondingly in address 35, and all of them should be "sticky"— meaning that setting one interrupt will not clear others that were set previously. This "stickiness" may be achieved by appropriate hardware design in the CPU. Additionally or alternatively, region 34 may comprise one byte in memory 32 for each bit in the interrupt register, and setting a given interrupt bit for a swapped-out VM is accomplished by writing "1" to the corresponding byte. When the VM is swapped in, each bit in the interrupt register gets a bit from the corresponding byte in the memory.

System 20 is connected to a network 38 via a NIC 36, such as a host channel adapter (HCA). Typically, NIC 36 maintains one or more dedicated transport service instances, such as queue pairs (QPs), for each VM 28. Upon receiving a packet from network 38 on a given QP, the NIC writes the packet contents to an appropriate address in memory 32 and directs an interrupt to the corresponding VM, indicating to the VM that there is packet data waiting to be serviced. (NIC 36 may also raise interrupts for other reasons.)

When VMs are swapped, VMM 30 informs NIC 36, typically by sending messages over bus 27, which VMs are active (currently swapped in and running on one of cores 22) and which have been swapped out. NIC 36 may issue its interrupts differently depending on whether the VM to which the interrupt is directed is active or swapped out. In an alternative implementation, VMM 30 may notify interrupt-handling hardware in CPU 21 of the swap, and the CPU hardware makes the interrupt-handling decisions that are attributed to the NIC in the following description.

When VMM 30 swaps out a given VM 28, it is important that interrupts generated by NIC 36 for this VM not be lost and that these interrupts be delivered to the VM when it is swapped back in. For this reason, the VMM notifies the NIC (or the appropriate CPU hardware) when it intends to swap a particular VM out. The interrupt-handling hardware in the NIC (or CPU) acknowledges this notification, and the VMM then performs the swap. Following the notification, subsequent interrupts generated for the swapped-out VM will be written to the assigned interrupt address 35 in memory 32. This protocol assures that all interrupts generated prior to the notification will be delivered to the VM before it is swapped out, and all interrupts occurring subsequently will be delivered to the VM after it is swapped back in. It is also important to ensure that interrupts generated during the process of swapping in a given VM be delivered reliably to the VM when it starts running. For this purpose, the interrupt-handling hardware in CPU 21 may be designed in such a way that when a value is written to the interrupt status register of the core 22 on which a given VM has been activated, the CPU hardware takes a logical OR between this value and the value held in the assigned interrupt address 35 for this VM (assuming the value of the "interrupt active" bit in the register is configured as active-high). A distinct "clear interrupt register" instruction is implemented in order to clear the interrupt status register.

In preparation for swapping a certain VM 28 into a given core 22, VMM 30 clears the interrupt status register on the core and notifies the interrupt-handling hardware in the NIC (or the CPU) of its intention to swap the VM in. Following this notification, all subsequent interrupts generated for this VM will be directed to the interrupt status register in core 22 (rather than to the assigned address in memory 32). The interrupt-handling hardware acknowledges this notification. VMM 30 swaps VM 28 into the core, wherein the swap includes writing the contents of interrupt address 35 from the VM context in memory 32 to the interrupt status register in the core hardware. Since this write operation causes the CPU hardware to take a logic OR between the value being written to the register and any value that is already stored there, any interrupts received during the swap-in process will be delivered to the VM once it starts running.

Figure 2:
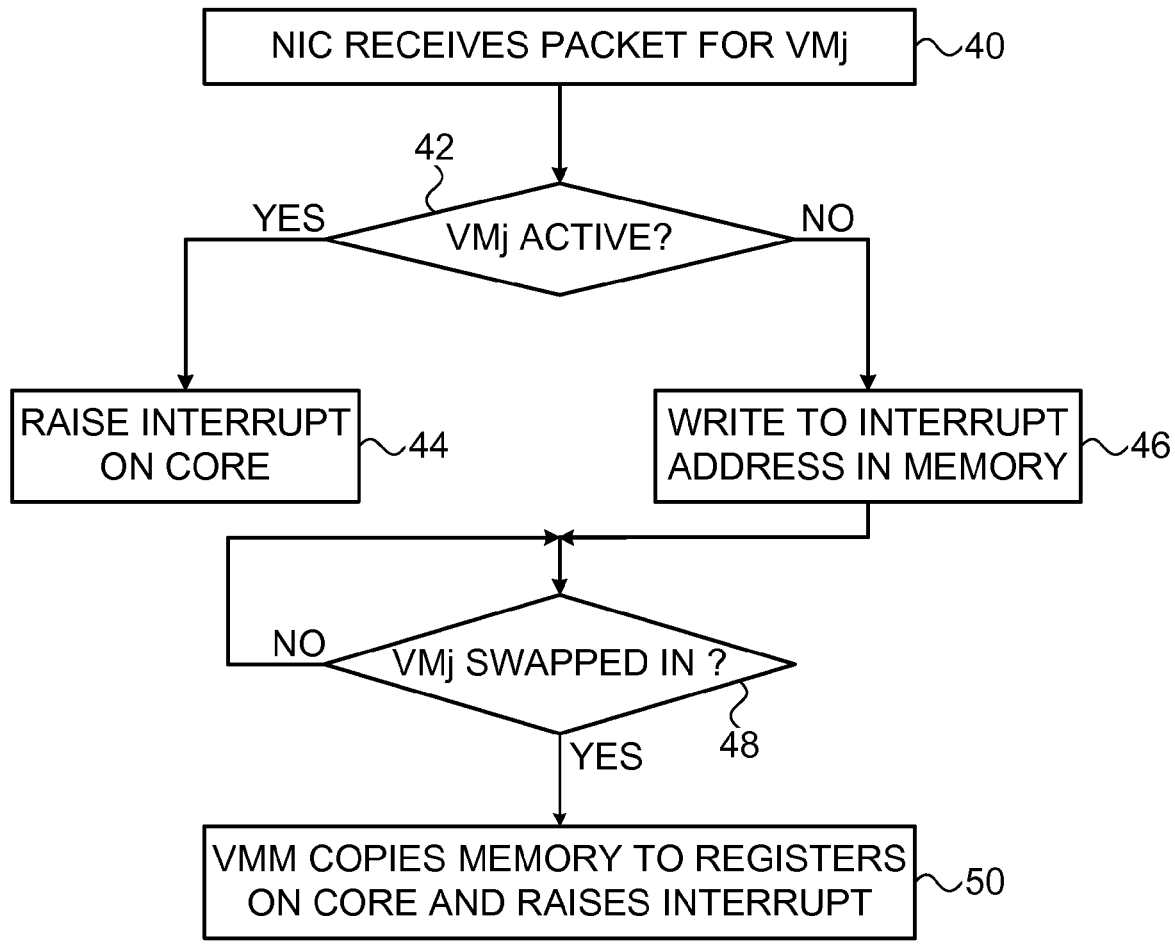
FIG. 2 is a flow chart that schematically illustrates a method for interrupt handling, in accordance with an embodiment of the present invention.

FIG. 2 is a flow chart that schematically illustrates a method for handling interrupts in system 20, in accordance with an embodiment of the present invention. The method in this embodiment is initiated when NIC 36 receives a packet from network 38 that is directed to a given VM 28, at a packet reception step 40. For example, the packet header may identify it as belonging to a certain QP, which is associated with a certain virtual machine VMj. NIC 36 writes the packet data to memory 32 and checks its internal records to determine whether VMj is active or swapped out, at a VM checking step 42. If VMj is active, NIC 36 may raise a hardware interrupt in the usual fashion, at an active interrupt step 44. For example, NIC 36 may send an interrupt message over bus 27 to the core 22 on which VMj is running, thereby raising interrupt pin 26.

On the other hand, if VMj is swapped out at step 42, NIC 36 writes an interrupt message to interrupt address 35 in the region 34 of memory 32 that is assigned to VMj, at an interrupt writing step 46. Typically, this interrupt will not be serviced immediately by CPU 21, but rather will wait until VMj is swapped in. VMM 30 may poll interrupt addresses 35 periodically and may decide to swap in a given VM 28 at a convenient time after discovering that this VM has an interrupt message waiting. Optionally, step 46 may be used only for low-priority types of interrupts; and for high-priority types, NIC 36 may send an interrupt directly to VMM 30 even when the target VM is swapped out in order to invoke immediate swap-in of this VM.

The interrupt written at step 46 is acted upon only after VMj is swapped into one of cores 22, at a swap-in step 48. At this stage, VMM 30 copies the context information in memory region 34 of VMj into registers 24 of the appropriate core, at a context switching step 50. Cores 22 are configured so that copying the interrupt message from address 35 to core 22 automatically raises interrupt pin 26. VMj will then service the interrupt in the normal manner, for example by reading the packet data that NIC 36 has written to memory 32 and passing the data for processing by the appropriate application running on VMj.

Although the embodiment that is shown in the figures and described above involves a particular computer system architecture and components, the principles of the present invention may be applied in substantially any suitable architecture and set of components. For example, the functionality described above with respect to NIC 36 may similarly be implemented in other sorts of devices, including various I/O, peripheral and processing devices.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
   running software including a plurality of virtual machines on a computer having one or more cores and a memory, such that different ones of the virtual machines are swapped out of operation on the cores at different times;
   assigning to the virtual machines, by operation of the software, respective interrupt addresses in the memory;
   upon occurrence on an input/output (I/O) device connected by a bus to the computer of an event that would cause the I/O device to direct an interrupt to a given virtual machine, identifying at the I/O device whether the given virtual machine is active or swapped out, and deciding, when the given virtual machine is swapped out of operation, not to send an interrupt directly to the CPU but to write an interrupt message from the I/O device to a respective interrupt address that is assigned to the given virtual machine in the memory, or to raise the hardware interrupt immediately when the given virtual machine is active; and
   upon activating the given virtual machine on a given core after writing of the interrupt message, copying, by operation of the software, a context of the given virtual machine from the memory to the given core and automatically raising a hardware interrupt on the given core responsively to the interrupt message in the memory.

2. The method according to claim 1, wherein the I/O device comprises a network interface controller (NIC), and wherein the event comprises receiving at the NIC a data packet directed to the given virtual machine.

3. The method according to claim 1, and comprising passing information from the computer to the device as to which of the virtual machines are active and which are swapped out, wherein the device decides whether to write the interrupt message or to raise the hardware interrupt responsively to the information.

4. The method according to claim 1, wherein the event causing the device to write the interrupt message is a low-priority event type, and wherein the method comprises, upon the occurrence at the device of events of a high-priority event type, raising the hardware interrupt for service by the given virtual machine immediately even when the given virtual machine is swapped out.

5. The method according to claim 1, wherein automatically raising the hardware interrupt comprises copying the interrupt message from the respective interrupt address to an interrupt status register on the given core.

6. The method according to claim 5, wherein copying the interrupt message comprises taking a logical OR between a first value stored in the respective interrupt address and a second value already held in the interrupt status register.

7. Computing apparatus, comprising:
   a central processing unit (CPU) comprising one or more computing cores, configured to run software including a plurality of virtual machines, such that different ones of the virtual machines are swapped out of operation on the cores at different times;
   a memory, connected to the computing cores, in which respective interrupt addresses are assigned by operation of the software to the virtual machines; and
   an input/output (I/O) device, which is connected by a bus to the cores and the memory and is configured, upon occurrence of an event that would cause the I/O device to direct an interrupt to a given virtual machine, to identify at the I/O device whether the given virtual machine is active or swapped out, and to decide, when the given virtual machine is swapped out of operation, not to send an interrupt directly to the CPU but to write an interrupt message to a respective interrupt address that is assigned to the given virtual machine in the memory, or to raise the hardware interrupt immediately when the given virtual machine is active,
   wherein the cores are configured, upon activating the given virtual machine on a given core after writing of the interrupt message, to copy, by operation of the software, a context of the given virtual machine from the memory to the given core and to automatically raise a hardware interrupt on the given core responsively to the interrupt message in the memory.

8. The apparatus according to claim 7, wherein the I/O device comprises a network interface controller (NIC), and wherein the event comprises receiving at the NIC a data packet directed to the given virtual machine.

9. The apparatus according to claim 7, wherein the I/O device is configured to receive information from the cores as to which of the virtual machines are active and which are swapped out, and to decide whether to write the interrupt message or to raise the hardware interrupt responsively to the information.

10. The apparatus according to claim 7, wherein the event causing the device to write the interrupt message is a low-priority event type, and wherein the device is configured, upon the occurrence at the device of events of a high-priority event type, to raise the hardware interrupt for service by the given virtual machine immediately even when the given virtual machine is swapped out.

11. The apparatus according to claim 7, wherein the cores comprise respective interrupt status registers and are configured, upon activating the given virtual machine, to copy the interrupt message from the respective interrupt address to an interrupt status register on the given core.

12. The apparatus according to claim 11, wherein the cores are configured, upon copying the interrupt message to the interrupt status register, to take a logical OR between a first value stored in the respective interrupt address and a second value already held in the interrupt status register.

* * * * *